(12) United States Patent
Rinne et al.

(10) Patent No.: US 11,247,213 B2
(45) Date of Patent: Feb. 15, 2022

(54) FLOTATION METHOD

(71) Applicant: OUTOTEC (FINLAND) OY, Espoo (FI)

(72) Inventors: Antti Rinne, Espoo (FI); Peter Gerard Bourke, Perth (AU)

(73) Assignee: OUTOTEC (FINLAND) OY, Espoo (FI)

( * ) Notice: Subject to any disclaimer, the term of this patent is extended or adjusted under 35 U.S.C. 154(b) by 318 days.

(21) Appl. No.: 16/324,660

(22) PCT Filed: Aug. 15, 2016

(86) PCT No.: PCT/FI2016/050562
§ 371 (c)(1),
(2) Date: Feb. 11, 2019

(87) PCT Pub. No.: WO2018/033658
PCT Pub. Date: Feb. 22, 2018

(65) Prior Publication Data
US 2019/0176166 A1  Jun. 13, 2019

(51) Int. Cl.
*B03D 1/02* (2006.01)
*G01F 1/00* (2006.01)
(Continued)

(52) U.S. Cl.
CPC .............. *B03D 1/028* (2013.01); *B02C 23/20* (2013.01); *B03D 1/02* (2013.01); *G01F 1/00* (2013.01);
(Continued)

(58) Field of Classification Search
CPC ........... B02C 23/20; B02C 23/30; B23D 1/02; B23D 1/028; G01F 1/00; B03D 2203/025
(Continued)

(56) References Cited

U.S. PATENT DOCUMENTS

| | | | |
|---|---|---|---|
| 1,402,099 A | 1/1922 | Shimmin et al. | |
| 2,436,375 A * | 2/1948 | Booth | B03D 1/028 210/703 |

(Continued)

FOREIGN PATENT DOCUMENTS

| | | |
|---|---|---|
| GB | 1228417 A | 4/1971 |
| GB | 1301461 A | 12/1972 |

(Continued)

OTHER PUBLICATIONS

International Preliminary Report on Patentability issued by the European Patent Office acting as the International Preliminary Examining Authority in relation to International Application No. PCT/FI2016/050562 dated Dec. 3, 2018 (6 pages).

(Continued)

*Primary Examiner* — Matthew Katcoff
*Assistant Examiner* — Smith Oberto Bapthelus
(74) *Attorney, Agent, or Firm* — Robert P. Michal, Esq.; Carter, DeLuca & Farrell LLP

(57) ABSTRACT

A flotation method for recovering valuable metal containing ore particles from ore particles suspended in slurry is disclosed. In the method, the slurry is treated in an at least one overflow flotation cell and the valuable metal containing ore particles are recovered by conducting the continuous upwards flow of slurry out of the at least one overflow flotation cell as slurry overflow. At least part of the slurry overflow is conducted to a further treatment step in a treatment system.

27 Claims, 3 Drawing Sheets

(51) Int. Cl.
  *B02C 23/20* (2006.01)
  *G01F 1/66* (2006.01)
(52) U.S. Cl.
  CPC ........ *G01F 1/661* (2013.01); *B03D 2203/025* (2013.01)
(58) Field of Classification Search
  USPC ...................................................... 241/1, 19
  See application file for complete search history.

(56) References Cited

U.S. PATENT DOCUMENTS

| | | | | |
|---|---|---|---|---|
| 3,735,931 | A | * | 5/1973 | Weston .................... B03D 1/06 241/20 |
| 3,964,997 | A | * | 6/1976 | Weston .................... B03D 1/02 209/166 |
| 4,133,746 | A | * | 1/1979 | Dopson ................... B03B 13/00 209/1 |
| 4,441,993 | A | * | 4/1984 | Howald .................... B03D 1/00 209/164 |
| 4,960,509 | A | | 10/1990 | McNeill |
| 5,456,362 | A | | 10/1995 | Laskowski et al. |

FOREIGN PATENT DOCUMENTS

| | | | |
|---|---|---|---|
| WO | 2012061897 | A1 | 5/2012 |
| WO | 2012160348 | A1 | 11/2012 |
| WO | 2015028958 | A1 | 3/2015 |

OTHER PUBLICATIONS

International Search Report issued by the Finnish Patent and Registration Office acting as the International Searching Authority in relation to International Application No. PCT/FI2016/050562 dated Dec. 13, 2016 (5 pages).
Written Opinion of the International Searching Authority issued by the Finnish Patent and Registration Office acting as the International Searching Authority in relation to International Application No. PCT/FI2016/050562 dated Dec. 13, 2016 (7 pages).
Extended European Search Report issued by the European Patent Office in relation to European Application No. 16906497.9 dated Apr. 6, 2020 (7 pages).
Search Report issued by the Chilean Patent Office in relation to Chilian Application No. 201900353 dated Nov. 12, 2019 (3 pages).
Office Action issued by the Chilean Patent Office in relation to Chilian Application No. 201900353 dated Nov. 12, 2019 (8 pages).
Written Opinion of the International Preliminary Examining Authority issued by the European Patent Office acting as the International Preliminary Examining Authority in relation to International Application No. PCT/FI2016/050562 dated Aug. 24, 2018 (5 pages).
Examination Report issued by the IP Australian Government in relation to Australian Application No. 2016419983 dated Jun. 19, 2019 (3 pages).
Office Action issued by the Eurasian Patent Office in relation to Eurasian Application No. 201990339/31 dated Feb. 14, 2020 (2 pages) along with English language translation (3 pages).
Office Action issued by the African Regional Intellectual Property Organization (ARIPO) in relation to Application No. AP/P/2019/011331 dated Jul. 12, 2021 (4 pages).

* cited by examiner

FLOTATION METHOD

FIELD OF THE INVENTION

The present invention relates to a flotation method for separating valuable metal containing ore particles from ore particles suspended in slurry.

SUMMARY OF THE INVENTION

According to the present invention, a flotation method is provided for recovering valuable metal containing ore particles from ore particles suspended in slurry. In the method, the ore particles are ground in a grinding step, classified in a classifier from which at least the overflow is conducted as a slurry feed to a treatment system comprising at least two flotation cells of which at least one is an overflow flotation cell operated with constant slurry overflow. The slurry is treated in the at least one overflow flotation cell by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. In the method, the volumetric flow rate of the slurry overflow is analysed and the flow rate of the slurry feed is controlled accordingly so that a continuous slurry overflow is generated. At least part of the slurry overflow is conducted to a further treatment step in the treatment system.

The technical effects of the current disclosure include that by inducing an overflow of entrained slurry instead of a conventional froth overflow from the flotation cell or cells, coarse valuable ore particles may be recovered efficiently. Coarse ore particles which may initially adhere to the flotation gas bubbles may be too heavy for the flotation gas bubbles to lift them upwards by buoyancy or become lifted as gas bubble-ore particle agglomerates with the upwards flow of the slurry. Therefore coarse ore particles may not be able to travel all the way up to the froth layer at the top part of the flotation cell to be collected as froth overflow from the flotation cell as would happen to entrapped ore particles in a conventional froth flotation cell. Instead, the coarser particles may become detached from the bubbles and fall back down to the bottom part of the flotation cell, if the continuous upwards flow of slurry is not kept strong enough to carry the coarse particles upwards by the movement of the flow alone, without the help of the flotation gas bubbles. In a conventional froth flotation cell, the mixing inside the cell is strongest in the bottom region of the cell and slowly recedes towards the top of the cell. This drop off in slurry mixing and rising slurry velocity is deliberate so that the rising air bubbles with attached valuable particles can transfer into the froth zone and form a deep froth layer. However, coarse particles attached to air bubbles continue to rise up until they reach this pulp/froth interface. It is at this point where 80% of these coarse particles will drop off back into the pulp phase because of their low contact angle with the air bubble and subsequent loss of buoyancy as the draining froth phase cannot support their weight. This particle dropback occurs at the pulp/froth interface. Coarse particles have a low contact angle with gas bubbles so they are easily dislodged at the pulp/froth interface and by any excess turbulence in the flotation cell. By coarse particles herein is meant ore particles with a P80 of 200 μm to 2000 μm. It will be understood by one skilled in the art that P80 means that 80% of the particles pass through a nominated screen mesh size. For example, a P80=600 μm means that 80% of all particles present will pass through a 600 μm screen aperture.

By being able to treat coarse particles in a flotation system, savings in energy consumption in the pre-treatment (comminution, grinding, classification) may be achieved. In contrast to the flotation method disclosed herein, conventional froth flotation process requires grinding and classifying the ore particles into fairly uniform particle size in order to be able to efficiently recover the desired fraction of the slurry.

The ability to process coarser sized particles means that the power consumption of the grinding step or grinding circuit may be significantly decreased, since there is no need to grind all the ore to a smaller particle size to enable processing through the flotation device. In other words, the P80 of the product size produced from the grinding circuit can be increased significantly.

The increase in P80 for the product size means that an ore only has to be ground sufficiently in the grinding circuit to release only the valuable minerals and not all of the gangue material has to be ground. Coarse particles may not all be fully liberated. There will be more composite particles through less grinding and coarser material. In comparison, it is required to grind the entire ore in order for the material to be within the conventional particle size limits to pass through a conventional flotation circuit or device without sanding up and keep the ore fully suspended through the flotation process.

At the same time, the ability to process coarser sized particles means that the particle size distribution in the feed slurry may vary more widely than conventionally permitted. For example, it is possible to treat fine ore particles concurrently in the process with coarse particles. The need for classification according to particle size may thus be eliminated or at least minimized. For example, only screening to get very coarse particles and mill balls out of the slurry to be fed into the flotation system, may be needed. By fine ore particles herein is meant ore particles of 200 μm or less.

By treating the slurry with the method as defined by this disclosure, recovery of valuable material containing particles may be increased. The initial grade of recovered material may be lower, but the material (i.e. slurry) is also thus readily prepared for further processing, which may include for example regrinding and/or cleaning. A cleaning stage may be performed first, for example by conventional froth flotation cleaner cell or cells, after which the slurry may be led to a grinding stage. For example, the tailings from the cleaner cell or cells, containing coarse composite particles may be sent to a regrinding circuit, and from there, to a circuit of recleaner cells for further upgrading. Also other types of cells such as a Jameson cell or a column cell can be used as cleaner cell, instead of a conventional froth flotation cell. In an embodiment, the slurry may be first led to a further grinding stage, and thereafter to a cleaning stage.

A further technical effect is that the flotation cells may be larger (i.e. the diameter of the cells may be greater) than conventional froth flotation cells. As the ore particles are continuously conducted out of the flotation cell by the controlled upwards flow of slurry, instead of by only entrapping them into the froth layer, there is no need for the ore particles to be conducted within the froth layer to the edges of the flotation cell to be collected into a launder surrounding the top part of the flotation cell. Thus the diameter of the cell is not a critical characteristic of the flotation cell, but may be significantly larger.

The present method may be utilised with conventional mechanically agitated flotation cells or tanks, i.e. no fluidised bed type flotation units are utilised. In certain embodiments, additional water and/or flotation gas feeds may not be needed, allowing for savings in water consumption, which may be very beneficial in operations in certain parts of the world, where availability of water may be a problem.

With the method described herein, the focus of treatment of slurry may be shifted on efficient separation of valueless fraction from the ore particles and recovering a maximal amount of valuable particles. In other words, ore particles comprising very small or even minimal amounts of valuable material may be recovered for further processing/treatment. This may be especially beneficial for ores of poor quality, i.e. ores with very little valuable material. The overflow cells may be understood to act as classifiers performing an initial separation of valuable material containing ore particles from ore particles comprising only gangue.

The present method employs the phenomena where smaller and/or lighter ore particles mostly become adherent to flotation gas bubbles to form gas-ore particle agglomerates which rise upwards within the flotation cell either by buoyancy or with the upwards flow of slurry, further assisted by feed of flotation gas. Coarse and/or heavier particles, which in a conventional flotation cell would have a tendency to drop back downwards as too heavy for the flotation gas bubbles or moderate upwards flow to lift all the way up to the froth layer, may be forced upwards by a sufficiently strong upwards flow of slurry created into the flotation cell to induce a slurry overflow. The upwards flow of slurry is created by slurry feed into the flotation cell. Further, in contrast to a conventional froth flotation cell, the coarse particles may truly be collected out of the flotation cell by the slurry overflow, whereas in a conventional froth flotation cell, even if the coarse particles would somehow end up in the froth layer, they may most likely be too heavy to remain in the froth layer long enough to travel to the outermost perimeter or edges of the froth layer to be able to flow out with the froth over the lip of the flotation cell into the launder. Most likely, in a conventional froth flotation cell, the coarse particles would fall back downwards, possibly even disrupting the upwards flow of gas bubble-ore particle agglomerates. In other words, in conventional froth flotation cells, up to 80% of the coarse ore particles, that is particles larger than 200 µm, suffer from the dropback phenomenon at the pulp/froth interface. As coarse particles have a very low contact angle with the gas bubbles, they will only stay a few seconds in the froth layer before they drop off and return to the pulp phase.

From the surface of the slurry at the top part of the flotation cell, the valuable metal containing ore particles overflow the launder lip of the flotation cell to be collected into the launder and led into further processing. By a launder lip is herein meant the peripheral edge of a flotation cell at the upper part of the cell over which froth overflow with valuable material particles flows to a launder. The collected material is then discharged to further processing. Some of the slurry overflow may be froth, but for most parts, the overflow is intentionally entrained slurry to ensure efficient recovery of valuable metal containing ore particles. As the mass pull to concentrate may be doubled by the present method, the amount of entrained slurry will effectively double into the product that is overflowing into the concentrate launder. For example, at least 15% by weight of solids of the slurry of valuable metal containing coarse ore particles may be recovered. The portion of the overflow by weight of solids in the slurry depends on the ore to be treated. In comparison, for example in a conventional copper rougher, 7-8% (by weight of solid material of the slurry) of valuable metal containing ore particles is recovered into the concentrate stream.

As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream. In an embodiment the amount of those particles may be 50% higher than that of a conventional froth flotation cell. The effect is that overall recovery of valuable material increases.

The reject stream, i.e. the fraction of the slurry containing particles that are hydrophilic and/or have not been trapped by the air bubbles/risen to the surface and recovered, is removed as tailings from the overflow cell by gravitationally conducting it out of the cell tank as a tailings flow. The tailings flow is then conducted to the following flotation cell as a feed input. Tailings from the overflow cell or cell may be conducted to at least one subsequent overflow cell followed by one or more conventional froth flotation cells; or straight to one or more conventional froth flotation cells, depending on the grade and type or ore particles to be treated. The subsequent flotation cell is downstream from the overflow flotation cell. In one embodiment, the subsequent flotation cell may be another overflow flotation cell. In another embodiment, it may be a conventional froth flotation cell. In yet another embodiment, there may be more than one conventional froth flotation cells arranged in series after the at least one overflow flotation cell. The tailings flow from each preceding cell is conducted to each subsequent cell as a feed input in a downstream arrangement. The final tailings is conducted to conventional reject treatment as final residue or reject.

In this disclosure the following definitions are used regarding flotation. Flotation involves phenomena related to the relative buoyancy of objects. Froth flotation is a process for separating hydrophobic materials from hydrophilic materials by adding gas, for example air, to process. Froth flotation could be made based on natural hydrophobic/hydrophilic difference or based on hydrophobic/hydrophilic differences made by addition of a surfactant or collector chemical. Gas can be added to the feedstock subject of flotation (slurry or pulp) by a number of different ways.

By a treatment system or flotation system herein is meant an assembly comprising a number, at least two flotation units or flotation cells that are arranged in fluid connection with each other for allowing either gravity-driven or pumped slurry flow between flotation units. The treatment system is meant for treating mineral ore particles suspended in slurry by flotation. Thus, valuable metal-containing ore particles are recovered from ore particles suspended in slurry. Slurry is fed through a feed inlet to the first flotation unit of the flotation line for initiating the flotation process. Flotation line is a part of a larger assembly. Therefore, a number of different pre- and post-treatment devices may be in operational connection with the components of the flotation line, as is known to the person skilled in the art.

By a flotation cell is herein meant a tank in which a step of a flotation process is performed. A flotation cell is typically cylindrical in shape. The flotation cells regularly have a circular cross-section. The flotation cells may have a polygonal, such as rectangular, square, triangular, hexagonal or pentagonal, or otherwise radially symmetrical cross-section, as well. In the current disclosure, diameter D refers to the diameter of a flotation cell having a circular cross section. If the shape of the flotation cell deviates from circular, D is to be understood as referring to a flotation cell having a corresponding inside bottom surface area. Further, by a diameter D is herein meant the average diameter of the flotation cell between the bottom and the launder lip, unless otherwise stated. The number of flotation cells may vary according to a specific treatment system and/or operation for treating a specific type and/or grade of ore, as is known to a person skilled in the art.

By pre-treatment and/or post-treatment is meant for example comminution, grinding, separation, screening, classification, fractioning, conditioning or cleaning, all of which are conventional processes as known to a person skilled in the art.

In one embodiment of the flotation method, at least one flotation cell is a flotation cell operated with conventional froth overflow.

In one embodiment of the flotation method, the slurry is agitated mechanically in the flotation cells.

The slurry may be subjected to mechanical agitation by at least one mechanical agitator such as a conventional motorized rotor-stator construction arranged at the bottom part of the flotation cell. The cell may have auxiliary agitators arranged higher up in the vertical direction of the cell, to ensure a sufficiently strong and continuous upwards flow of the slurry.

In one embodiment of the flotation method, the volumetric flow rate of the slurry overflow is analysed by direct measurement.

In one embodiment of the flotation method, the volumetric flow rate of the slurry overflow is analysed by measuring the difference between the volumetric flow rate of the slurry feed and the volumetric flow rate of a tailings flow from the at least one overflow flotation cell. It is also conceivable that the volumetric flow rate of a concentrate stream is measured, either with a flowmeter after it has been conducted forward, or via a weir overflow measuring device. By concentrate stream herein is meant slurry overflow.

In one embodiment of the flotation method, the further treatment step in the treatment system comprises at least one of the following: a second overflow cell, a flotation cell operated with conventional froth flotation, a flotation cleaner cell operated with conventional froth flotation. The further step may include also at least one of the following: rougher, scavenger cell or scavenger circuit.

In one embodiment of the flotation method, the further treatment step in the treatment system comprises a grinding step.

Depending on the type and grade of ore to be treated, in order to gain a desired end result, i.e. properties of the final product, the slurry overflow or slurry stream led out from the overflow cell or cells either as a tailings flow or as an accept flow or overflow, may be conducted into at least one further treatment step. The required further treatment depends on the grade and type of the ore, as well as the ore particle size distribution, as is known by the person skilled in the art. For example, the quality of ore particles recovered by overflow may be fairly heterogeneous, and the particle size variation may be large. Therefore it may be necessary to regrind the recovered particles suspended in the overflow stream at some point to get a uniform end product. Further, some amount of additional cleaning is needed for the same reasons.

It is conceivable that, in an embodiment, the at least one overflow cell may operate as a classifier from which the accept (i.e. overflow stream) is then treated in a subsequent conventional flotation process. The further step may comprise treatment in an individual treatment unit such as a single flotation cell or a grinding mill, or in a circuit comprising a sub-process such as cleaning circuit comprising several cleaner cells.

In one embodiment of the flotation method, the slurry overflow from the at least one overflow flotation cell is conducted to the further step in the treatment system by gravity.

By arranging the line or system of flotation cells in such a manner that allow the slurry to be conducted by gravity, the need for pumping within the overall operation can be reduced, and thus savings in energy and maintenance costs may be achieved.

In one embodiment of the flotation method, the volume of the at least one overflow flotation cell is at least 300 m$^3$.

In effect, a conventional froth flotation cell or tank may be used as an overflow cell without any specific modifications or construction operations. Existing flotation plants and/or flotation cell configurations may be readily and easily altered or remodelled for operating at slurry overflow instead of conventional froth overflow.

In one embodiment of the flotation method, the volume of the at least one overflow flotation cell is at least 500 m$^3$.

In one embodiment of the flotation method, the diameter of the at least one overflow flotation cell is at least 8 m.

In one embodiment of the flotation method, the diameter of the at least one overflow flotation cell is at least 10 m.

In effect, by using a larger flotation cell (larger in volume, diameter) than a conventional flotation cell, a more efficient operation may be achieved for particular types and/or grades of ore. Savings through economy of scale may be achieved, i.e. savings in capital expenditure as well as operational expenditure. By using larger flotation cells as the same amount of slurry may be treated with fewer individual flotation cells requiring fewer constructional parts such as inlets, outlets, piping, transfer means, as well as foundations and construction space for the flotation line. Also the flotation cells following the overflow cell or cells may be smaller and/or less subsequent flotation cells may be needed, further reducing the aforementioned costs.

In one embodiment of the flotation method, the volume of the at least one flotation cell operated with conventional froth flotation is less than 75% of the volume of the at least one overflow flotation cell.

In one embodiment of the flotation method, the volume of the at least one flotation cell operated with conventional froth flotation is less than 60% of the volume of the at least one overflow flotation cell.

In one embodiment of the flotation method, the volume of the at least one flotation cell operated with conventional froth flotation is less than 10% of the volume of the at least one overflow flotation cell.

In effect, since the overflow cell or cells is configured to recover significantly more coarse valuable particles (by weight), there is no need for large subsequent cells, but rather, the subsequent cells downstream from the overflow cell or cells may be smaller and therefore more efficient in recovering particles which most likely have less valuable metal in them, i.e. are harder to be led to the surface and froth layer.

In one embodiment of the flotation method, the volumetric flow rate of the tailings flow from the at least one overflow flotation cell is regulated by a control valve.

In one embodiment of the flotation method, the slurry level within the at least one overflow flotation cell is measured by a level measurement device, and the control valve is adjusted based on the measured slurry level to keep the slurry overflow from the at least one overflow flotation cell at a target level.

In one embodiment of the flotation method, the volumetric flow rate of the slurry overflow from the at least one overflow flotation cell is analysed by an analysing device, and the control valve is adjusted based on the analysed volumetric flow rate of the slurry overflow to keep the overflow from the at least one overflow flotation cell at a target level.

In one embodiment of the flotation method, the analysing device is an online laser analyser.

The volumetric flow of slurry overflow may be controlled by regulating the tailings flow based on slurry level measurement, and by analysing the quality of the slurry overflow allows further control based on the amount of solid particles recovered by the constant overflow. The volumetric flow rate of the slurry overflow is controlled by analysing the properties of the output flow from the overflow cell. The analysis may be done by analysing the slurry flow coming out of the overflow cell and being conducted to further treatment. An online laser analyser offers the possibility to analyse the slurry indirectly and accurately from the flow. Based on the analysis, the level of the slurry suspension within the overflow cell is adjusted by controlling the tailings flow, i.e. the gravitational flow of reject out of the overflow cell, by a valve.

Both level measuring devices and online flow analysers are suitable for installation in existing flotation systems, which means no costly refittings are needed. A control system based on the abovementioned, simple measurements is both cost-effective and easily operated while still ensuring an efficient recovery of desired material.

In one embodiment of the flotation method, after being ground in the grinding step, at least 80% of the ore particles have a particle size of less than 650 µm.

In one embodiment of the flotation method, after being ground in the grinding step, at least 80% of the ore particles have a particle size of less than 400 µm.

In effect, the present method can be used to treat larger and/or coarser particles than what could be treated with conventional froth flotation or flotation solutions utilising fluidisation. As mentioned before, significant savings in energy consumption during grinding of the ore may be reached when there is no need to grind the particles to a uniform particle distribution and to a relatively small P80 value. In the method according to this disclosure, the actual size distribution of the ore particles is less significant than in the conventional prior art solutions. Since the slurry to be treated is first conducted to a flotation cell driven with constant overflow achieved by strong upwards flow of slurry within the cell, even larger particles comprising valuable metal may be able to reach the surface and flow out to be collected to further processing. In froth flotation this does not happen efficiently since flotation gas bubbles may not have sufficient buoyancy to lift the coarser particles upwards, or the coarser particles reaching the froth layer with low contact angle would most likely drop back into the slurry phase since they may be too heavy to travel to the launder lip at the perimeter of the froth layer. Increasing the upwards flow by increasing the mechanical agitation and/or infeed flow rate in conventional froth flotation cells or flotation cells utilising fluidised beds would disrupt particle-bubble agglomerates needed for efficient recovery of valuable particles.

In one embodiment of the flotation method, the amount of solids in the slurry overflow from the at least one overflow flotation cell is at least 20% by weight.

In one embodiment of the flotation method, the amount of solids in the slurry overflow from the at least one overflow flotation cell is at least 10, or 15-55% by weight.

By treating the slurry with relatively high amount of solids, the amount of (dilution) water needed to feed into the flotation system may be decreased. By proxy, this may also affect the energy consumption favourably through reductions in pumping needs.

In one embodiment of the flotation method, the mass pull of the at least one overflow flotation cell is at least 10%.

In one embodiment of the flotation method, the mass pull of the at least one overflow flotation cell is 15-20%.

In effect, the at least one overflow cell may not be very selective in recovering the desired valuable material containing ore particles. Instead, it may be efficient in removing gangue of undesired particles comprising little or no valuable material. In particular, with slurries comprising relatively poor raw material, i.e. ore particles with relatively little valuable material to begin with; and with slurries comprising 1) coarse particles, 2) particles of wide size variation and/or 3) ore fines, the overflow cell may be very efficient.

By mass pull herein is meant the percentage of the material (mass) fed into the flotation system being taken out from the system as a concentrate of the accept flow. For a flotation process to be considered selective, the mass pull % should be as small as possible. An overflow flotation tank is directed at pulling at least double the mass to a concentrate launder, i.e. the goal is not selectivity but increased or even maximum recovery of any ore particles containing even a small amount of valuable material.

A conventional froth flotation cell may have a mass pull of 5 to 8%. In contrast, with an overflow flotation cell as described herein, a significantly greater mass pull may result to lower concentrate grade but a higher overall recovery of valuable material is extracted from the process. The grade of the concentrate is then improved by further treating the slurry overflow from the overflow flotation cell in for example conventional froth flotation cell or cells, and/or in froth flotation cleaner cell or cells.

By employing overflow flotation cells as described herein, it may be possible to have for example only two flotation lines comprising altogether 10 flotation cells (which include both the overflow type and conventional type of flotation cells) instead of a typical configuration of five flotation lines each equipped with seven cells, totaling 35 cells. In effect, utilising overflow flotation cells in the treatment system, savings in capital expenditure may be significant, especially in operations of low grade ore treatment.

The embodiments of the invention described herein may be used in any combination with each other. Several of the embodiments may be combined together to form a further embodiment of the invention. An apparatus, or a method, or a use, to which the invention is related, may comprise at least one of the embodiments of the invention described herein.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
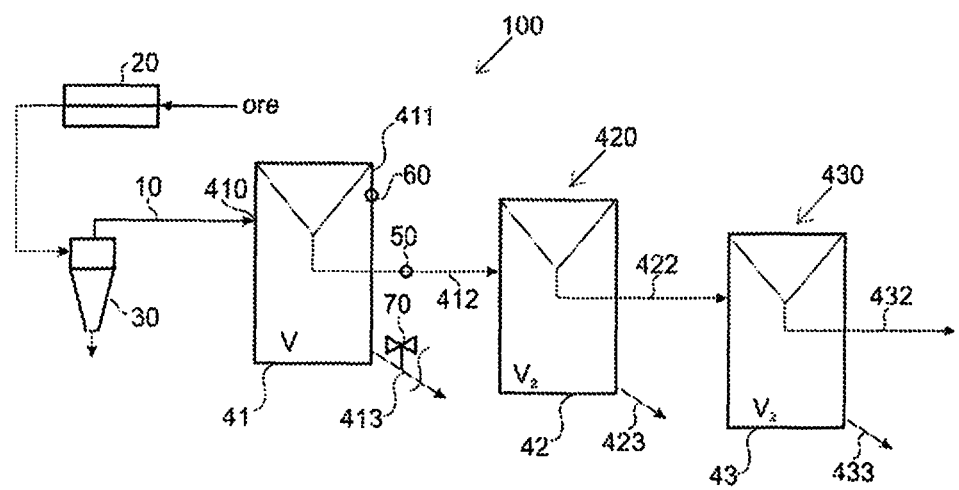
FIG. 1 is a schematic flowsheet diagram of an exemplary embodiment of the method according to the invention.

Reference will now be made in detail to the embodiments of the present invention, examples of which are illustrated in the accompanying drawings.

In FIGS. 1 to 4, a flotation cell 41 receives a flow of suspension, that is, a flow of slurry 410 comprising ore particles, water and flotation chemicals such as collector chemicals and non-collector flotation reagents. The collector chemical molecules adhere to surface areas on ore particles having the valuable mineral, through an adsorption process. The valuable mineral acts as the adsorbent while the collector chemical acts as the adsorbate. The collector chemical molecules form a film on the valuable mineral areas on the surface of the ore particle. The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air pumped to flotation cell 41, 42, 43. A sufficient amount of adsorbed collector molecules on sufficiently large valuable mineral surface areas on an ore particle may cause the ore particle to become attached to a flotation gas bubble.

Ore particles become attached or adhered to gas bubbles to form gas bubble-ore particle agglomerates. These agglomerates rise to the surface of the flotation cell at the uppermost part 411 of the cell 41 by buoyancy of the gas bubbles, as well as with the continuous upwards flow of slurry induced by both mechanical agitation and the infeed of slurry into the cell 41, 42, 43. In addition, in an overflow flotation cell 41, ore particles not adhering or attached to the gas bubbles may rise upwards with the continuous upwards flow of slurry by themselves.

The gas bubbles may form a layer of froth. This is the case at least in the conventional forth flotation cells 42, 43. Froth may also be formed in the overflow flotation cell 41, but it is not necessary for the operation of the cell.

Froth gathered to a surface of slurry in froth flotation cell 42, 43, comprising the gas bubble-ore particle agglomerates is let to flow out of flotation cell 42, 43 via a launder lip. In case of the overflow flotation cell 41, the continuous upwards flow of slurry itself is let to flow out of the cell 41 over the launder lip as entrained slurry overflow containing ore particles, gas bubble-ore particle agglomerates and water.

The collected slurry overflow 412, 422, 432, i.e. the concentrate slurry streams, may be led to further processing B or collected as a final product A, depending on the point of a treatment system 100, at which the overflow 412, 422, 432 is collected. In one embodiment, the slurry, or concentrate slurry stream, containing the valuable metal containing particles is constantly overflowed out of the cell 41 via the launder lip, i.e. no continuous froth zone is formed at the uppermost part 411 of the flotation cell 41. Tailings 413 may be arranged to flow via an outlet to a subsequent flotation cell and finally out of the process as gangue or final residue C. The removal may be achieved by gravity or by pumping.

The treatment system 100 comprises at least two flotation cells 41, 42, 43. At least one of those flotation cells is an overflow flotation cell 41 operated with constant slurry overflow. At least one other may be a flotation cell 42, 43, operated with conventional froth overflow. The flotation cells 42, 43, are thus conventional froth flotation cells 42, 43.

Prior to being introduced into the treatment system 100, suspended in slurry 10, the ore and ore particles to be treated may be subjected to a number of pre-treatment steps. First, the ore may be ground in a grinding step 20 comprising at least one grinding mill, which may be any suitable grinding mill as is known by a person skilled in the art, and the grinding may be performed in any suitable manner, dry or wet.

In an embodiment, at least 80% of the ore particles in the slurry 10 may have a particle size of less than 650 µm after being ground in the grinding step 20. In one embodiment, at least 80% of the ore particles in the slurry 10 may have a particle size of less than 400 µm after being ground in the grinding step 20.

Following the grinding step 20, the ore may be screened (not shown in the figures) to remove very large or unground particle and mill classified balls, followed by a classification step in a classifier 30, which may, for example comprise at least one hydrocyclone. The classification is done in order to achieve a suitable particle size distribution for the ore particles. After the classifier 30, the classifier overflow slurry 10 may be led into a conditioner step, where the ore is mixed with for example suitable amount of dilution water and suitable flotation chemicals in a manner known for the person skilled in the art. The thus prepared slurry is then led into the treatment system 100 as a slurry feed 410.

The slurry is first introduced into an overflow flotation cell 41, in which the slurry is treated by introducing flotation gas bubbles into the slurry by any conventional means. The slurry may be agitated mechanically by means of for example a rotor-stator type agitator disposed in the flotation cell, or by utilising any other type of mechanical agitation known in the art. There may be one or more auxiliary agitators disposed in the flotation cell in the vertical direction of the flotation cell, as well. A continuous upwards flow of slurry is created in the vertical direction of the overflow flotation cell by means of the gas bubbles and the slurry feed 410, which is controlled to achieve a desired upwards flow which is strong enough to carry both the gas bubble-ore particle agglomerates and plain ore particles of even coarse particle size upwards towards the top part of the flotation cell 411, and finally out of the cell 41 via the launder lip, together with the additional forces created by the mechanical agitation and the gas bubbles, as described above.

The flow rate of the slurry feed 410 may be controlled by analysing the volumetric flow rate of the slurry overflow 412 to create a continuous slurry overflow. The volumetric flow rate of the slurry overflow 412 may be analysed by direct measurement with an analysing device 50. In an embodiment, the analysing device may be a direct analyser. In an embodiment, the analysing device may be an indirect analyser such as an online laser analyser to allow indirect analysis of the flow. Also other analysing devices known to a person skilled in the art are conceivable.

In one embodiment, the volumetric flow rate of the slurry overflow 412 may be analysed by measuring a difference between the volumetric flow rate of the slurry feed 410 and the volumetric flow rate of the tailings flow 413 from the overflow flotation cell 41. There are also other parameters to control the process. For example, the parameters could be gas amount and reagents.

Further, the tailings flow 413 from the cell 41 may be regulated by a control valve 70. The control valve 70 may be adjusted based on a measurement of a slurry level within the overflow flotation cell 41, which slurry level is measured by a level measurement device 60. The level measurement device 60 may be any suitable device known in the art. The tailings flow 413 may thus be controlled to keep the slurry overflow 412 at a target level. In an embodiment, the control valve 70 may be adjusted base on the analysed volumetric flow rate of the slurry overflow 412 to keep the overflow at a target level.

In an embodiment, the amount of solids in the slurry overflow 412 from the at least one overflow cell 41 may be at least 20% by weight. In one embodiment, the amount of solids in the slurry overflow 412 from the at least one overflow cell 41 may be at least 10, or 15-55% by weight.

In an embodiment, the mass pull of at least one overflow cell 41 may be at least 10%. In one embodiment, the mass pull of at least one overflow cell 41 may be 15 to 20%.

Figure 2:
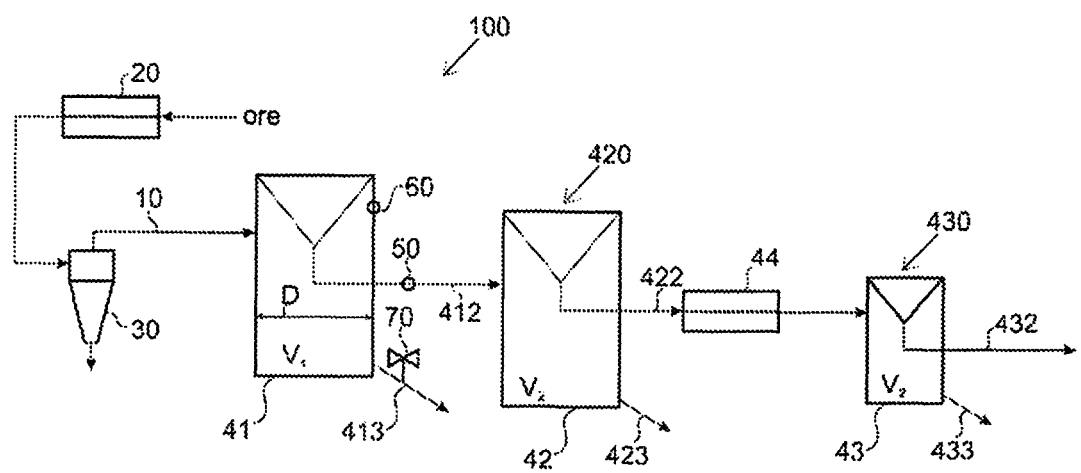
FIG. 2 is a schematic flowsheet diagram of another exemplary embodiment of the method according to the invention.
Figure 3:
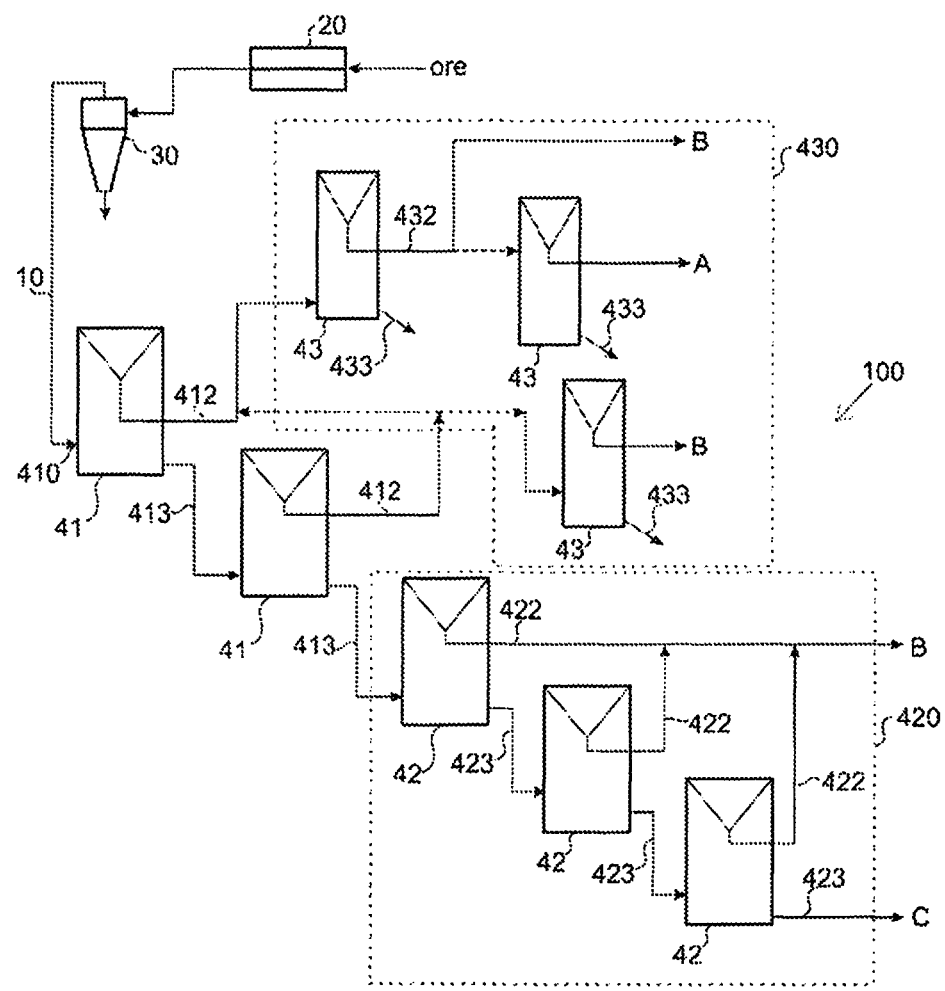
FIG. 3 is a schematic flowsheet diagram of yet another exemplary embodiment of the method according to the invention.
Figure 4:
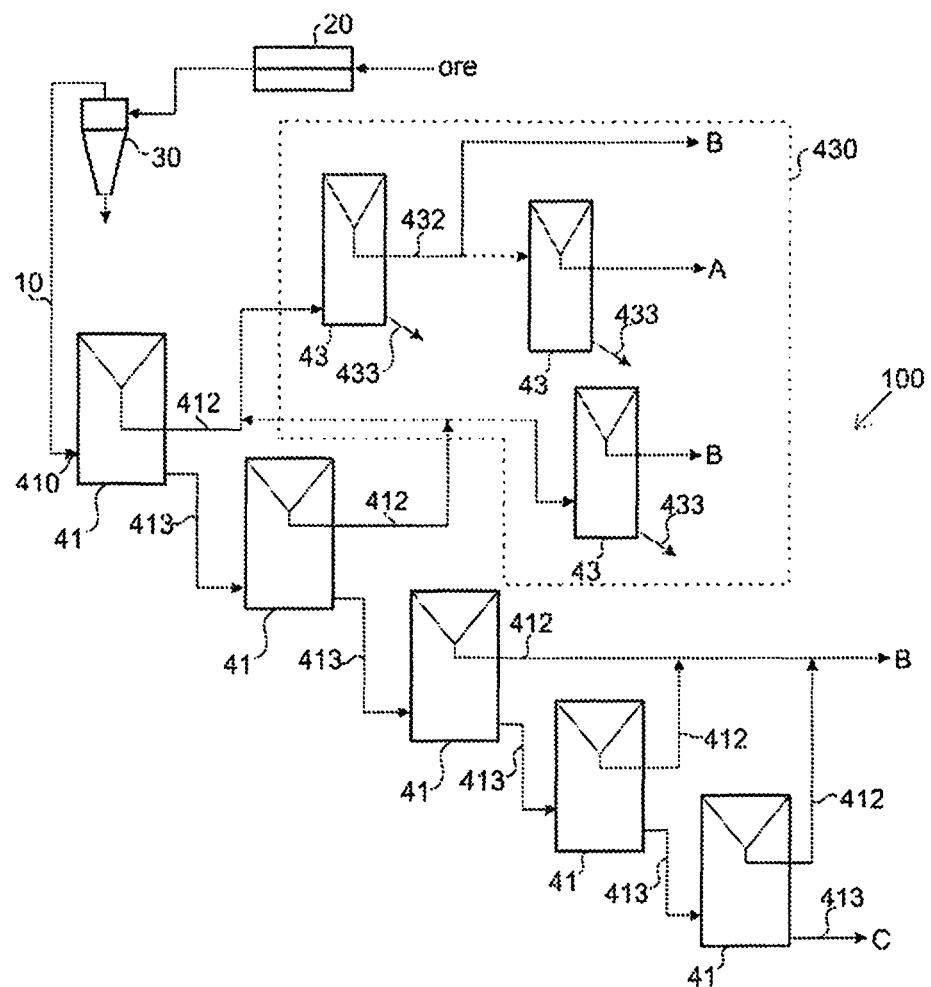
FIG. 4 is a schematic flowsheet diagram of yet another exemplary embodiment of the method according to the invention.

At least part of the slurry overflow 412 may be conducted to at least one further treatment step 420, 430 within the treatment system 100. The further treatment step 420, 430 may comprise a second overflow cell 41, a flotation cell operated with conventional froth flotation 42, or a flotation cleaner cell operated with froth flotation 43. The further treatment step may also comprise, additionally or alternatively, a grinding step 44, for example an individual grinding mill or a grinding circuit (FIG. 2). Each of the further treatment steps 420, 430, 44 may comprise at least one treatment unit, as can be seen in FIG. 1 or 2, or several treatment units arranged into a treatment circuit, as has been presented in FIG. 3 or 4.

Both the slurry overflow 412 and/or the tailings flow 413 may be conducted to a further treatment step. Examples of treatment systems 100 are now presented in the following with reference to FIGS. 3 and 4.

In one embodiment (FIG. 3), the slurry feed 410 is led into a first flotation cell which is an overflow flotation cell 41. The slurry is treated in the cell as described above, after which the overflow 412 is led into a first further treatment step 430, and the tailings flow 413 is led into a second overflow flotation cell 41, where the slurry is again treated similarly to the first overflow flotation cell 41. The slurry overflow 412 from the second overflow flotation cell is conducted to the first further treatment step 430, and the tailings flow 413 to a second further treatment step 420.

The further treatment step 430 comprises a number of froth flotation cleaner cells 43 operated with a conventional froth flotation. In this embodiment, there are three cleaner cells 43, but the number may vary from one to 10, depending on the type and grade of the raw material ore to be treated. The slurry overflow from the first overflow flotation cell 41 is led into a first cleaner cell 43, from which an accept flow 432 is collected in the form of froth overflowing the cell launder lip, and subsequently led into further processing B. The accept flow 432 may also be further treated in a second cleaner cell 43, from which the accept flow 432 is taken out as a final product flow A. The slurry overflow from the second overflow flotation cell 41 is conducted either to a third cleaner cell 43 from which the accept flow 432 is led into further processing B, or to the above-described circuit of first and second cleaner cells 43, depending on the total metal content. Thus, the grade and flowrate of the overflow will affect the stream distribution. Tailings flows 433 from the cleaner cells 43 are led out of the treatment system 100 to be handled in any suitable way as known for the person skilled in the art.

The second further treatment step 420 comprises a number of conventional froth flotation cells 42. The tailings from 413 from the second overflow flotation cell 41 is led into the first one of these froth flotation cells 42, where it is treated in the conventional manner and collected from the froth layer over the launder lip as an accept flow 422. A tailings flow 423 from the first froth flotation cell 42 is led into a second froth flotation cell 42, from which an accept flow 422 is collected as described above, and a tailings flow 423 led into a third conventional froth flotation cell 43. An accept flow 422 from this cell is also collected and led, together with the accept flows 422 from the other conventional froth flotation cells 42 into further processing B. The final tailings flow 423 from the third conventional froth flotation cell 42 is led out the treatment system 100 as final residue C.

In another embodiment (FIG. 4) the slurry feed 410 is led into a first flotation cell which is an overflow flotation cell 41. The slurry is treated in the cell as described above, after which the overflow 412 is led into a first further treatment step 430, and the tailings flow 413 is led into a second overflow flotation cell 41, where the slurry is again treated similarly to the first overflow flotation cell 41. The slurry overflow 412 from the second overflow flotation cell is conducted to the first further treatment step 430.

The tailings flow 413 from the second overflow flotation cell 41 is conducted to a third overflow flotation cell 41. The tailings flow 413 from the third overflow cell 41 is led into a fourth overflow flotation cell 41, from which the tailings flow 413 is led to yet another, a fifth overflow flotation cell 41, from which the final tailings 413 are taken out of the treatment system 100 as final residue C. The slurry overflows 412 from the last three overflow flotation cells 41 are collected and led to further processing B.

These two embodiments are presented herein only as exemplary process configurations. Any kind of other configurations are conceivable, as well. For example, the number of overflow flotation cells 41, conventional froth flotation cells 42 and cleaner cells 43 may vary, and their relative order in relation to the flow direction of the treatment system 100 may vary. The treatment system 100 may further comprise additional steps such as a grinding step 44 at any suitable point of the system in the flow direction. The specific process configuration for the treatment system 100 may depend on the type and grade of ore to be treated, as well as other operational variables.

Further processing B may comprise any necessary process steps to increase the product grade, for example regrinding and/or cleaning. Regrinding may comprise treatment in a fine grinding mill to liberate more valuable mineral, which may then be recovered with further processing. Further processing may also comprise, alternatively or additionally, upgrading the accept flow 412, 422, 432 in a conventional flotation cell. In an embodiment, further processing B may also comprise simply conducting the accept flow 412, 422, 432 back to the head of the treatment system 100, by pumping or other means, to be introduced back into the flotation line as part of the slurry feed 410, i.e. as a recirculation load. The manner of further processing B may depend on the accept grade, i.e. the properties of the concentrate grade will affect the manner how a particular flow is to be treated.

The slurry overflows 412, 422, 433, as well as the tailings flows 413, 423, 433 may be conducted to any subsequent treatment step 420, 430, 44 by gravity, i.e. by not using any pumping or other specific energy-requiring transfer means. Some of the aforementioned flows may be conducted by gravity, and some by pumping or other energy-requiring transfer means.

The size of the flotation cells 41, 42, 43 may be selected according to process variables such as type, grade, or amount of ore to be treated in any specific operation.

In an embodiment, the at least one overflow flotation cell 41 may have a volume $V_1$ of at least 300 m³. In one embodiment, the first overflow flotation cell 41 in the treatment system 100 may have a volume $V_1$ of at least 300 m³. In an embodiment, at least one overflow flotation cell 41 may have a volume $V_1$ of at least 500 m³. In one embodiment, the first overflow flotation cell 41 of the treatment system 100 may have a volume $V_1$ of at least 500 m³. It is conceivable that the volume $V_1$ of at least one overflow flotation cell 41, or the first overflow flotation cell 41 in the treatment system 100, may be even larger, for example have a volume $V_1$ of 630 m³, 775 m³, 1000 m³, or 2000 m³. There may be more than one overflow flotation cells 41 in the treatment system 100 with the abovementioned volume $V_1$.

In an embodiment, at least one of the overflow flotation cells 41 may have a diameter D of at least 8 m. The diameter D of the first overflow flotation cell 41 of the treatment system 100 may have a diameter of at least 8 m. In one embodiment, at least one of the overflow flotation cells 41 may have a diameter D of at least 10 m. The diameter D of the first overflow flotation cell 41 of the treatment system 100 may have a diameter of at least 10 m. It is conceivable that the diameter D of at least one overflow flotation cell 41, or the first overflow flotation cell 41 in the treatment system 100, may have a diameter D of for example 11 m, 12 m, 14 m, or 17 m. There may be more than one overflow flotation cells 41 in the treatment system 100 with the abovementioned diameter D.

In an embodiment, at least one of the flotation cells operated with conventional froth flotation, that is, for example the conventional froth flotation cells 42 or the cleaner cells 43, may have a volume $V_2$ of less than 75% of the volume $V_1$ of the at least one overflow flotation cell 41. In one embodiment, at least one of the flotation cells operated with conventional froth flotation 41, 42, may have a volume $V_2$ of less than 60% of the volume $V_1$ of the at least one overflow flotation cell 41. In one embodiment, at least one of the flotation cells operated with conventional froth flotation 41, 42, may have a volume $V_2$ of less than 10% of the volume $V_1$ of the at least one overflow flotation cell 41. In an embodiment, all of the conventional froth flotation cells 41 or cleaner cells 42 have a volume $V_2$ that is at least 75%, or at least 60%, or 10% smaller than the volume $V_1$ of the at least one overflow flotation cell 41. In other embodiments, the volume $V_2$ of the conventional forth flotation cells 42, or the cleaner cells 43, may vary, but is still smaller than the volume $V_1$ of the at least one froth flotation cell 41.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A flotation method for recovering valuable metal containing ore particles from ore particles suspended in slurry, wherein:
   the ore particles are ground in a grinding step,
   the ore particles are classified in a classifier from which at least an overflow is conducted as a slurry feed to a treatment system comprising at least two flotation cells of which at least one is an overflow flotation cell operated with constant slurry overflow and with virtually no froth depth or no froth layer,
   the slurry is treated in the at least one overflow flotation cell by introducing flotation gas bubbles into the slurry and by creating a continuous upwards flow of slurry in a vertical direction of a first flotation cell of the at least two flotation cells,
   at least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles not adhering to the gas bubbles rise upwards with the continuous upwards flow of slurry,
   the valuable metal containing ore particles are recovered by conducting the continuous upwards flow of slurry out of the at least one overflow flotation cell as slurry overflow,
   a volumetric flow rate of the slurry overflow is analysed and the flow rate of the slurry feed is controlled so that the constant slurry overflow is generated, and
   at least part of the slurry overflow is conducted to a further treatment step in the treatment system.

2. The method according to claim 1, wherein at least one flotation cell of the at least two flotation cells is a flotation cell operated with conventional froth overflow.

3. The method according to claim 1, wherein the slurry is agitated mechanically in the flotation cells.

4. The method according to claim 1, wherein the volumetric flow rate of the slurry overflow is analysed by direct measurement.

5. The method according to claim 1, wherein the volumetric flow rate of the slurry overflow is analysed by measuring the difference between a volumetric flow rate of the slurry feed and a volumetric flow rate of a tailings flow from the at least one overflow flotation cell.

6. The method according to claim 1, wherein the further treatment step in the treatment system comprises at least one of the following: a second overflow cell, a flotation cell operated with conventional froth flotation, a flotation cleaner cell operated with conventional froth flotation.

7. The method according to claim 1, wherein the further treatment step in the treatment system comprises a further grinding step.

8. The method according to claim 1, wherein the slurry overflow from the at least one overflow flotation cell is conducted to the further step in the treatment system by gravity.

9. The method according to claim 1, wherein the volume of the at least one overflow flotation cell is at least 300 m3.

10. The method according to claim 9, wherein the volume of the at least one overflow flotation cell is at least 500 m3.

11. The method according to claim 1, wherein the diameter of the at least one overflow flotation cell is at least 8 m.

12. The method according to claim 11, wherein the diameter of the at least one overflow flotation cell is at least 10 m.

13. The method according to claim 1, wherein the volume of the at least one flotation cell operated with conventional froth flotation is less than 75% of the volume of the at least one overflow flotation cell.

14. The method according to claim 13, wherein the volume of the at least one flotation cell operated with conventional froth flotation is less than 60% of the volume of the at least one overflow flotation cell.

15. The method according to claim 13, wherein the volume of the at least one flotation cell operated with conventional froth flotation is less than 10% of the volume of the at least one overflow flotation cell.

16. The method according to claim 1, wherein a volumetric flow rate of a tailings flow from the at least one overflow flotation cell is regulated by a control valve.

17. The method according to claim 16, wherein a slurry level within the at least one overflow flotation cell is measured by a level measurement device, and the control valve is adjusted based on the measured slurry level to keep the slurry overflow from the at least one overflow flotation cell at a target level.

18. The method according to claim 16, wherein the volumetric flow rate of the slurry overflow from the at least one overflow flotation cell is analysed by an analysing device, and the control valve is adjusted based on the analysed volumetric flow rate of the slurry overflow to keep the overflow from the at least one overflow flotation cell at a target level.

19. The method according to claim 18, wherein the analysing device is an online laser analyser.

20. The method according to claim 1, wherein, after being ground in a grinding mill, at least 80% of the ore particles have a particle size of less than 650 μm.

21. The method according to claim 20, wherein, after being ground in the grinding step, at least 80% of the ore particles have a particle size of less than 400 μm.

22. The method according to claim 1, wherein the amount of solids in the slurry overflow from the at least one overflow flotation cell is at least 20% by weight.

23. The method according to claim 1, wherein the amount of solids in the slurry overflow from the at least one overflow flotation cell is at least 10% by weight.

24. The method according to claim 1, wherein the amount of solids in the slurry overflow from the at least one overflow flotation cell is at least 15-55% by weight.

25. The method according to claim 1, wherein a mass pull of the at least one overflow flotation cell is at least 10%.

26. The method according to claim 25, wherein the mass pull of the at least one overflow flotation cell is 15-20%.

27. The method according to claim 1, wherein creating the continuous upwards flow of slurry in the vertical direction of the first flotation cell includes infeeding the slurry into the first flotation cell upwardly.

* * * * *